United States Patent
Buckley et al.

(10) Patent No.: US 7,711,349 B2
(45) Date of Patent: May 4, 2010

(54) APPARATUS, AND ASSOCIATED METHOD, FOR GENERATING AN ALERT TO NOTIFY EMERGENCY PERSONNEL OF A VEHICULAR EMERGENCY

(75) Inventors: Adrian Buckley, Tracy, CA (US); Sean Simmons, Waterloo, CA (US)

(73) Assignee: Research in Motion Limited, Waterloo (CA)

( * ) Notice: Subject to any disclaimer, the term of this patent is extended or adjusted under 35 U.S.C. 154(b) by 607 days.

(21) Appl. No.: 11/410,275

(22) Filed: Apr. 24, 2006

(65) Prior Publication Data

US 2007/0247289 A1 Oct. 25, 2007

(51) Int. Cl.
*H04M 11/04* (2006.01)

(52) U.S. Cl. ............... 455/404.2; 455/456.1; 455/41.2; 455/457; 340/988; 342/547

(58) Field of Classification Search ........... 455/404.2, 455/456.1, 41.2, 457; 340/988; 342/547
See application file for complete search history.

(56) References Cited

U.S. PATENT DOCUMENTS

| 6,340,928 | B1 | 1/2002 | McCurdy | |
|---|---|---|---|---|
| 6,493,629 | B1 | 12/2002 | Van Bosch | |
| 7,113,108 | B1 * | 9/2006 | Bachelder et al. | 340/906 |
| 2002/0137489 | A1 | 9/2002 | Dutta et al. | |
| 2003/0146852 | A1 * | 8/2003 | O'Dell | 340/932.2 |
| 2004/0142678 | A1 | 7/2004 | Krasner | |
| 2004/0166828 | A1 | 8/2004 | Yosioka | |
| 2005/0096007 | A1 | 5/2005 | Lappe et al. | |
| 2005/0253461 | A1 * | 11/2005 | Konno | 307/10.5 |
| 2008/0259886 | A1 * | 10/2008 | Svarre et al. | 370/338 |

FOREIGN PATENT DOCUMENTS

JP   2001250183   9/2001

OTHER PUBLICATIONS

Working Document, Vehicle Functionality Working Group (ECIV), version 1.0, "Apparatus, And Associated Method, For Generating an Alert to Notify Emergency Personal of a vehicular Emergency," pp. 1-13, Sep. 27, 2006.

* cited by examiner

*Primary Examiner*—Nghi H Ly

(57) ABSTRACT

Apparatus, and an associated method, for automatically reporting on the occurrence of a vehicular emergency. A vehicular-positioned transceiver searches for the presence of a paired transceiver positioned in proximity to the vehicular-positioned transceiver. The paired transceiver, forming part of a mobile station operable in a cellular communication system, is identified and used upon the occurrence of the vehicular emergency automatically to generate a report message that is routed to a public safety access point.

20 Claims, 4 Drawing Sheets

APPARATUS, AND ASSOCIATED METHOD, FOR GENERATING AN ALERT TO NOTIFY EMERGENCY PERSONNEL OF A VEHICULAR EMERGENCY

The present invention relates generally to a manner by which automatically to alert a public safety access point (PSAP), or other emergency personnel dispatch station, of the occurrence of a vehicular emergency. More particularly, the present invention relates to apparatus, and an associated method, that notifies the PSAP, or other station, of the occurrence with identification of the vehicle and additional information about the vehicular emergency.

A Bluetooth™ or other local area transceiver is mounted at the vehicle. When the vehicular emergency occurs, the local area transceiver communicates with a cellular mobile station, or other wide area transceiver, that also has local area communication capabilities. And, the cellular mobile station, or other wide area transceiver, communicates with the PSAP. Communications between the wide area transceiver and the PSAP are carried out using TTY (text telephony) devices located at the wide area transceiver and at the PSAP, thereby to alert the PSAP of the vehicular emergency.

BACKGROUND OF THE INVENTION

Advancements in communication technologies have permitted the development and deployment of many new types of communication devices and the introduction of many new types of communication services. For instance, the networks of cellular communication systems have been deployed over significant portions of the populated areas of the world. A subscriber to a cellular communication system communicates with the network part of the system through use of a cellular mobile station positioned within a coverage area defined by the network. A radio air interface is defined between the mobile station and the network and radio signals are communicated therebetween by way of the radio air interface.

The network of the cellular communication system is connected to other communication networks, such as a packet data network and a conventional, telephonic network. Communications are thereby effectual between the mobile station and an endpoint of the data network or telephonic network. Because the mobile station communicates by way of radio signals communicated on the radio air interface, the mobile station need not be positioned at a location at which wireline connections are available to interconnect the mobile station with a communication network. Communication mobility is also permitted of the mobile station as the mobile station is operable free of any fixed connection to a communication network.

Many millions of subscribers make use of cellular communication systems through which to communicate telephonically and to communicate data. Many cellular mobile stations also provide for communications by hearing-impaired users. Such mobile stations include TTY (Text Telephony) elements, typically including TTY modems, that provide for textual entry of data by a user at the mobile station as well as reception of TTY data displayable in visual form for the user of the mobile station.

Use of a cellular communication system through which to communicate provides many conveniences, e.g., permitting subscribers to communicate even when positioned at locations at which wireline connections are unavailable. A subscriber is able to communicate, for instance, when traveling in a motor vehicle. Moreover, cellular communication systems not only provide for convenience, but also are advantageously utilized for purposes of personal and public safety. A subscriber is able to communicate, using a cellular communication system, with emergency personnel, such as those of an emergency dispatch center to request emergency assistance and to report emergency conditions. Emergency dispatch centers, herein referred to, at times, as public safety access points (PSAPs), have equipment and personnel for communicating with those requesting assistance. Such PSAPs also typically include TTY devices to communicate with requesters that utilize TTY devices.

Recent attention has been directed towards manners by which automatically to report vehicular emergencies, e.g., accidents in which airbags are deployed or in which a vehicle is overturned. Automatic reporting ensures that emergency personnel shall be informed of the vehicular emergency, thereby to be able to respond to the emergency. Various problems have heretofore limited the deployment of automated mechanisms in vehicles for the reporting of the vehicular emergencies. While every vehicle can be outfitted with a cellular mobile station that permanently forms part of the vehicle, mobile stations require SIM cards that uniquely identify each mobile station. Outfitting each vehicle with a separate SIM card is impractical due to reasons of cost, lack of availability of IMSI values, and issues regarding recovery of SIM cards when the vehicle is no longer operated.

A need remains, therefore, to provide a manner by which automatically to report a vehicular emergency.

It is in light of this background information related to emergency reporting of vehicular emergencies making use of a radio communication system that the significant improvements of the present invention have evolved.

DETAILED DESCRIPTION

Figure 1:
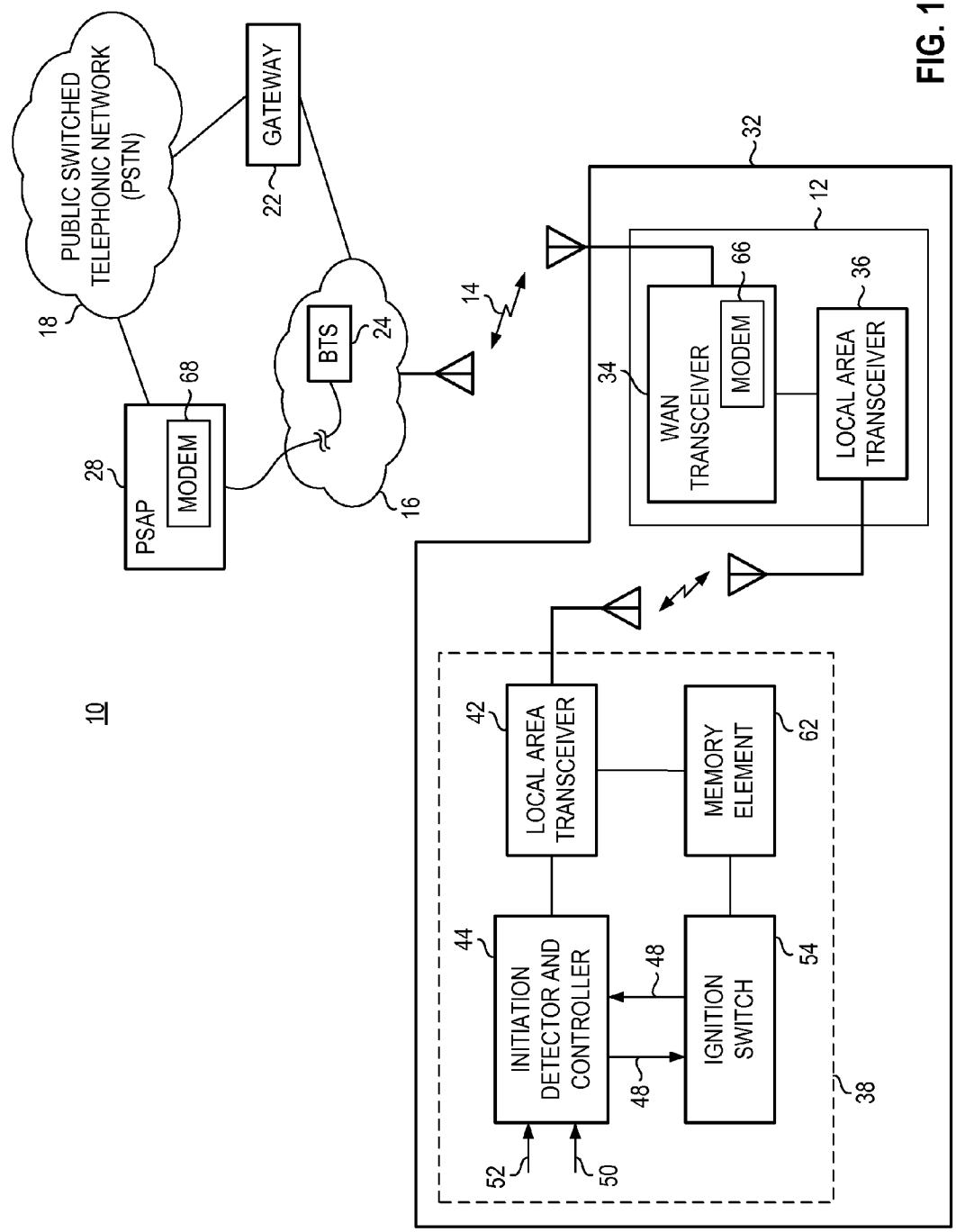
FIG. 1 illustrates a functional block diagram of a communication system in which an embodiment of the present invention is operable.

The present invention, accordingly, advantageously provides apparatus, and an associated method, by which automatically to alert a PSAP (Public Safety Access Point), or other emergency personnel dispatch station, of the occurrence of a vehicular emergency.

Through operation of an embodiment of the present invention, a manner is provided to notify the PSAP, or other station, of the occurrence with identification of the vehicle and additional information about the vehicular emergency.

In one aspect of the present invention, a Bluetooth™, or other, local area transceiver is mounted at the vehicle. When the vehicular emergency occurs, the local area transceiver communicates with a cellular mobile station or other wide area transceiver that also has local area communication capabilities. And, the cellular mobile station communicates with the PSAP. Communications between the cellular mobile station and the PSAP are carried out using TTY devices located at the cellular mobile station and at the PSAP to alert the emergency personnel of the occurrence of the emergency.

In another aspect of the present invention, the local area transceiver, mounted at the vehicle, searches for the presence of the cellular, or other wide area, transceiver. When such a wide area transceiver having local area communication capabilities is within proximity to the local area transceiver, the local area transceiver obtains an indication of the identity of the local area transceiver. The identity comprises, for instance, an IP (Internet Protocol) address of the local area transceiver positioned together with the cellular mobile station. That is to say, the local area transceiver mounted at the vehicle searches for a paired transceiver, i.e., a transceiver operable to communicate with the vehicular-mounted local area transceiver.

In another aspect of the present invention, the local area transceiver is caused to search for the presence of the cellular mobile station having the local area transceiver capability responsive to a vehicular trip start event. The vehicular trip start event comprises, for instance, the turning of an ignition switch at the vehicle at which the vehicular-positioned local area transceiver is mounted. Or, the vehicular trip start event comprises, e.g., operator actuation of an actuation switch. For instance, a switch positioned at the passenger compartment of the vehicle, available for actuation by a driver of the vehicle is actuated when the driver elects to commence the search operation for the presence of a cellular mobile station having a local area transceiver forming a portion thereof.

In another aspect of the present invention, a storage element, such as an accessible memory location, is used to store the identity of the transceiver identified by the vehicular-positioned local area transceiver. The memory location is later accessed in the event that a report of a vehicular emergency is required. The identity is used to address a message that is sent by the vehicular-mounted local area transceiver to the transceiver identified by the identifier stored at the memory location.

In another aspect of the present invention, the message, once provided to the transceiver identified to be in proximity to the vehicular-mounted transceiver, is communicated to the PSAP using the radio air interface of the cellular communication system and the network parts extending to the PSAP.

In another aspect of the present invention, the indicia are obtained of the identity of the vehicle, such as its VIN (Vehicular Identification Number) and the type of vehicular emergency. The type of vehicular emergency is identified by, e.g., detecting deployment of airbags, detecting overturning of the vehicle, or detection of some other anomaly condition.

In another aspect of the present invention, the cellular mobile station includes a TTY element, such as a TTY modem, capable of communicating TTY-formatted data with the PSAP. The PSAP also includes TTY functionality; viz., the PSAP also includes a TTY modem, capable of exchanging TTY-formatted data with the cellular mobile station. Information contained in the message sent by the cellular mobile station to report on the occurrence of the vehicular emergency is displayable upon a monitor connected to the TTY modem of the PSAP. Appropriate dispatch of personnel is made in response to the vehicular emergency report.

Advantage is taken of the common usage of cellular mobile stations. Passengers in a vehicle carry cellular mobile stations that also have Bluetooth™, or other local area transceiver, capabilities. The vehicular-mounted local area transceiver searches for the presence of a cellular mobile station within proximity thereto. And, when a cellular mobile station having the local area transceiver capabilities is detected, its identity is stored and used to route a message in the event of the occurrence of a vehicular emergency. The message includes the identification of the vehicle, its location, such as provided by a GPS receiver, an indication of the type of emergency, and any other appropriate information. The cellular mobile station, in turn, alerts the PSAP of the vehicular emergency through operation of the TTY modem. The appropriate dispatch of emergency personnel to respond best to the vehicular emergency is carried out, all in response to an automatic generation and transmission of the vehicular emergency report.

In these and other aspects, therefore, apparatus, and an associated methodology, is provided for initiating communication of emergency data pursuant to a vehicular emergency. A paired transceiver detection initiation detector is adapted to detect occurrence of a vehicular trip start event. The paired transceiver detection initiation detector is configured to generate a paired transceiver search command responsive to the occurrence of the vehicular trip start event. A local transceiver is adapted to receive the paired transceiver search command generated by the paired transceiver detection initiation detector. The local transceiver is also adapted to receive indicia associated with the vehicle at which the local transceiver is positioned and to receive indication of occurrence of the vehicular emergency. The local transceiver is configured to perform a paired transceiver search responsive to the paired transceiver search command and to generate a vehicular emergency report responsive to the indication of the occurrence of the vehicular emergency.

Referring first, therefore, to FIG. 1, an exemplary communication system, shown generally at 10, provides for communications between communication endpoints, including mobile stations of which the mobile station 12 is representative. The mobile station 12 communicates by way of communication channels, here designated by the arrow 14, defined upon a radio air interface with a communication network, here formed of a radio access network 16 and a PSTN (Public Switched Telephonic Network) 18. The networks 16 and 18 are interconnected, in conventional manner, here by way of a gateway 22.

The radio access network is here shown to include a base transceiver station (BTS) 24 that includes transceiver elements that transceive communication signals with corresponding circuitry of the mobile station 12. In conventional manner, a typical radio access network includes a plurality of spaced-apart base transceiver stations that together encompass a geographical area over which communications by, and with, mobile stations are permitted. Any of various communication endpoints are connectable to the networks 16 and 18. Here, a PSAP (Public Safety Access Point) 28 is connected to the networks 16 and 18. The PSAP is defined at an emergency dispatch center that receives requests for emergency assistance, and, responsive to such requests, instructs emergency personnel to respond to such requests. The PSAP is, e.g., in the United States, a 911-center to which 911 emergency calls are routed. A call originated at a mobile station, such as the mobile station 12, is routable to the PSAP 28.

The mobile station 12 is representative of a mobile station carried by an occupant of a vehicle 32. That is to say, the mobile station 12 is carried by a user, and, when the user is positioned at the vehicle 32, the mobile station, carried by the user, is also positioned at the vehicle. When the user leaves the vehicle, the mobile station, if carried by the user, is also carried away from the vehicle. The mobile station 12 is not fixedly positioned at the vehicle but, rather, is likely to be positioned at the vehicle only temporarily.

The mobile station 12 includes a set of transceivers, a wide area network (WAN) transceiver 34, and a local area (LA) transceiver 36. The transceiver elements 34 and 36 are connected together in conventional manner. In the exemplary implementation, the wide area network transceiver forms a cellular transceiver capable of transceiving the communication signals that are received from, and transmitted to, the radio access network 16. And, the local area transceiver forms a Bluetooth™ transceiver capable of sending and receiving signals over short ranges, e.g., on the order of thirty meters or less. The capacity of a mobile station, such as the mobile station 12, to communicate over a wide area using the transceiver element 34 and to communicate over a local area using the transceiver element 36 is used to advantage pursuant to an embodiment of the present invention.

Pursuant to an embodiment of the present invention, the vehicle 32 includes apparatus 38 of an embodiment of the present invention. The apparatus includes a local area transceiver 42, here also a Bluetooth™ transceiver. The transceiver, herein referred to as a vehicular-positioned transceiver for the reason that, in the exemplary implementation, the transceiver 42 is permanently maintained at the vehicle 32, is capable of communicating with the transceiver 36, or corresponding transceiver of another mobile station when positioned in the passenger compartment of the vehicle or is otherwise in proximity to the transceiver 42.

The apparatus 38 further includes an initiation detector and controller 44. The detector and controller comprises, for instance, an application executable by processing circuitry. The detector and controller is positioned in communication connectivity with the local area transceiver and, in the exemplary implementation, both exert control over its operation and provides indicia to the transceiver that is communicated during operation of the transceiver pursuant to an embodiment of the present invention. The detector and controller is provided input indicia, here represented by way of the lines 48, 50 and 52. The line 48 represents a line upon which a trip-start event indicia is provided to the detector and controller. The trip-start event indicia forms, for instance, an indication of an operator of the vehicle 32 turning an ignition switch to commence operation of the vehicle. And, here, the line 48 extends to the ignition switch 54, or electrical contacts thereof. When the operator of the vehicle turns a key in the ignition switch 54, an indication of the start of the vehicular engine is provided by way of the line 48 to the detector and controller 44.

The line 50 is representative of vehicular emergency indicia that is generated upon the occurrence of a vehicular emergency. The indicia is generated, for instance, upon deployment of safety airbags, upon detection of level sensors of upending of the vehicle, or other type of collision sensor indications that indicate collision of the vehicle.

And, the line 52 is representative of a line upon which vehicular identity information, such as a vehicle identification number (VIN) is provided to the detector and controller. The identifier identifies the vehicle, and when the identifier forms the VIN, the vehicle is uniquely identified.

In operation, upon detection of the trip start event, the detector and controller causes the local area transceiver 42 to commence searching operations to detect presence of one to many paired transceivers in proximity to the transceiver 42. The paired transceiver is a transceiver capable of communicating with the transceiver 42 and, here, the transceiver 36 forming a portion of the mobile station 12 defines a paired transceiver when the mobile station 12 is positioned in the passenger compartment of the vehicle or otherwise is positioned in proximity to the transceiver 42 of the apparatus 38.

In the exemplary implementation in which the transceivers 36 and 42 form Bluetooth™-compatible transceivers, interrogation and reply messages are generated, in conventional manner, in conformity with standard Bluetooth™ protocols. The transceiver 36 is identified, e.g., by an IP (Internet Protocol) address. Responsive to the search or inquiry by the transceiver 42, a reply message, containing the IP address of the transceiver 36 is returned to the transceiver 42. A memory element 62, connected to, or forming part of, the transceiver 42 is used to store the IP address, or other identifier, that identifies the transceiver 36. When a plurality of mobile stations 12 are positioned at the vehicle 32 or otherwise positioned in proximity to the transceiver 42, the identities of the plurality of mobile stations and indications thereof are stored at the memory element 62. The identities are ordered in an ordered list, according to any desired selection criteria, and the identities are accessed in the listed order.

In one implementation, subsequent to the initial search made by the transceiver 42, subsequent searches are made at periodic, or other, intervals so that the information stored at the memory element is timely. And, in the event that, responsive to a search, no mobile stations are determined to be at the vehicle 32 or otherwise in proximity thereto, subsequent searches are made at selected intervals to detect the presence of mobile stations subsequently in position in proximity to the transceiver 42.

In the absence of occurrence of a vehicular emergency, the detection of the trip start event and subsequent searching for transceivers in proximity to the vehicular-positioned transceiver 42 is repeated each time that a trip start event is detected. Upon the occurrence of a vehicular emergency, indication of its occurrence is provided to the detector and controller 44 by way of the line 52. And, the detector and controller alerts the vehicular-positioned transceiver 42 of the occurrence. In response, the transceiver 42 is caused to generate a message that is communicated to the transceiver 36 whose identity is stored at the memory element 62. That is to say, the contents of the memory element are retrieved in order to identity to where to route a message that is generated by the vehicular-positioned transceiver.

Once ascertained, the memory contents are used to address the message and the message is populated with indications of the vehicular emergency together with the identity of the vehicle. The message is sent and delivered to the identified transceiver, here the transceiver Information contained in the message is utilized pursuant to a request made by the wide area network transceiver 34 to the PSAP 28.

In the exemplary implementation, the transceiver 34 includes a TTY modem 66 capable of transmitting TTY-formatted data. The PSAP 28 also includes a TTY modem, designated at 68, also capable of communicating TTY-formatted data. Subsequent to conventional call set-up with the PSAP, in the exemplary implementation, the information associated with the vehicular emergency is communicated by way of the TTY modems. The call is placed automatically, and the information is communicated automatically, without need for user interaction. In the event that the occupants of the vehicle are unable to place a call for emergency assistance or provide other information, the information needed to alert the PSAP and the personnel thereat of the occurrence of the vehicular emergency is automatically provided.

In a further implementation, indicia provided to the detector and controller also includes GPS (Global Positioning System) positioning information, and such positioning information is included in the message generated by the local area transceiver 42 and is communicated to the PSAP. Personnel at the emergency dispatch center at which the PSAP is positioned are able to respond to the exact location at which the vehicular emergency has occurred.

Figure 2:
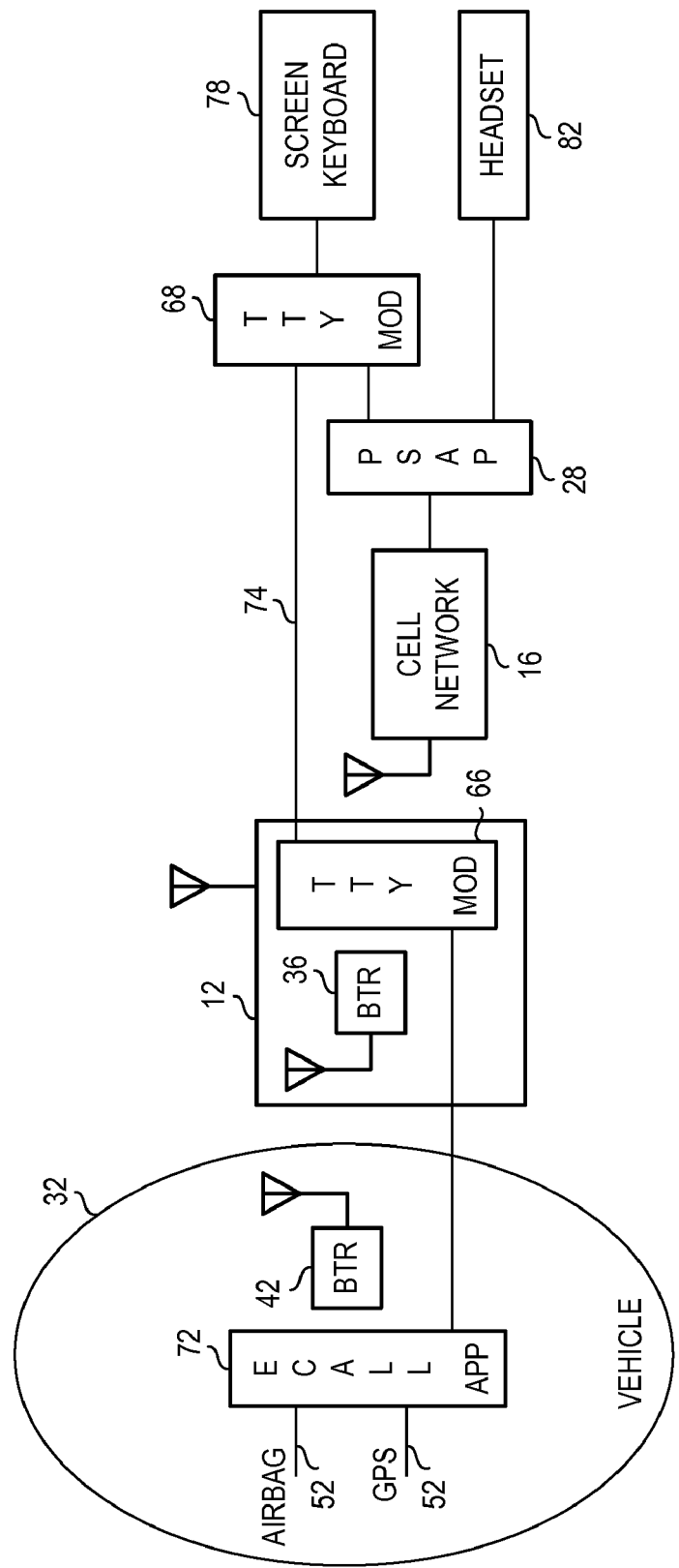
FIG. 2 illustrates a functional block diagram illustrating portions of the communication system shown in FIG. 1.

FIG. 2 illustrates a representation of various of the elements shown in the communication system of FIG. 1. Again, the vehicle 32 is shown at which the vehicular-positioned transceiver 42 is located. The transceiver is positioned in communication connectivity with an e-call application 72 that forms the initiation detector and controller 44, shown in FIG. 1, in the exemplary implementation. Lines 52 extending to the application 72 provide indication of deployment of an airbag and GPS information.

As noted previously, upon the occurrence of the vehicular emergency, the information associated with the vehicular emergency is communicated to a mobile station 12 by way of the paired transceiver 36 paired with the transceiver 42. And, the information is provided to the TTY modem 66 forming part of the wide area network transceiver of the mobile station.

A call is automatically placed by the mobile station to the PSAP by way of the network 16. And, the modem 68 of the PSAP is placed in communication connectivity, here indicated by way of the lines 74, with the modem 66. Information, in textual form, is communicated to the TTY modem 68 and subsequently displayed upon a screened keyboard 78. A headset 82 is also positioned at the PSAP to permit an operator positioned thereat to receive calls placed to the PSAP.

Any of various pertinent information is provided in the form of textual data including the GPS coordinates, the vehicle orientation, deployment of airbags, and, if so, which of the airbags are deployed, the VIN of the vehicle, a time stamp of the accident, as well as service provider identifications, e.g., the cellular operator through which the call was placed. Data is also communicated, if needed, by the modem 68 to the modem 66, e.g., to communicate requests for further information. By including the identity of the vehicle, by way of its VIN or other identifier, the identity of the vehicle is validated.

Here, when a determination is made to make an e-call, the application uses the default cell phone known to be in proximity of the vehicle. Knowledge of the proximity is made pursuant to a search procedure initiated, e.g., by the vehicle operator's turning of an ignition key, starting of the engine, actuation of an actuator, etc. Responsive to the search, a paired transceiver, if any, positioned in proximity to the vehicular-positioned transceiver is detected. A record is maintained of the detected transceiver, and in the event of a vehicular emergency, the identity of the detected transceiver is used pursuant to an emergency call. If the identified transceiver is unavailable, a message is attempted to be communicated to another transceiver, if any. If no other transceivers are recorded to be available, a new search is undertaken to detect for its presence.

Figure 3:
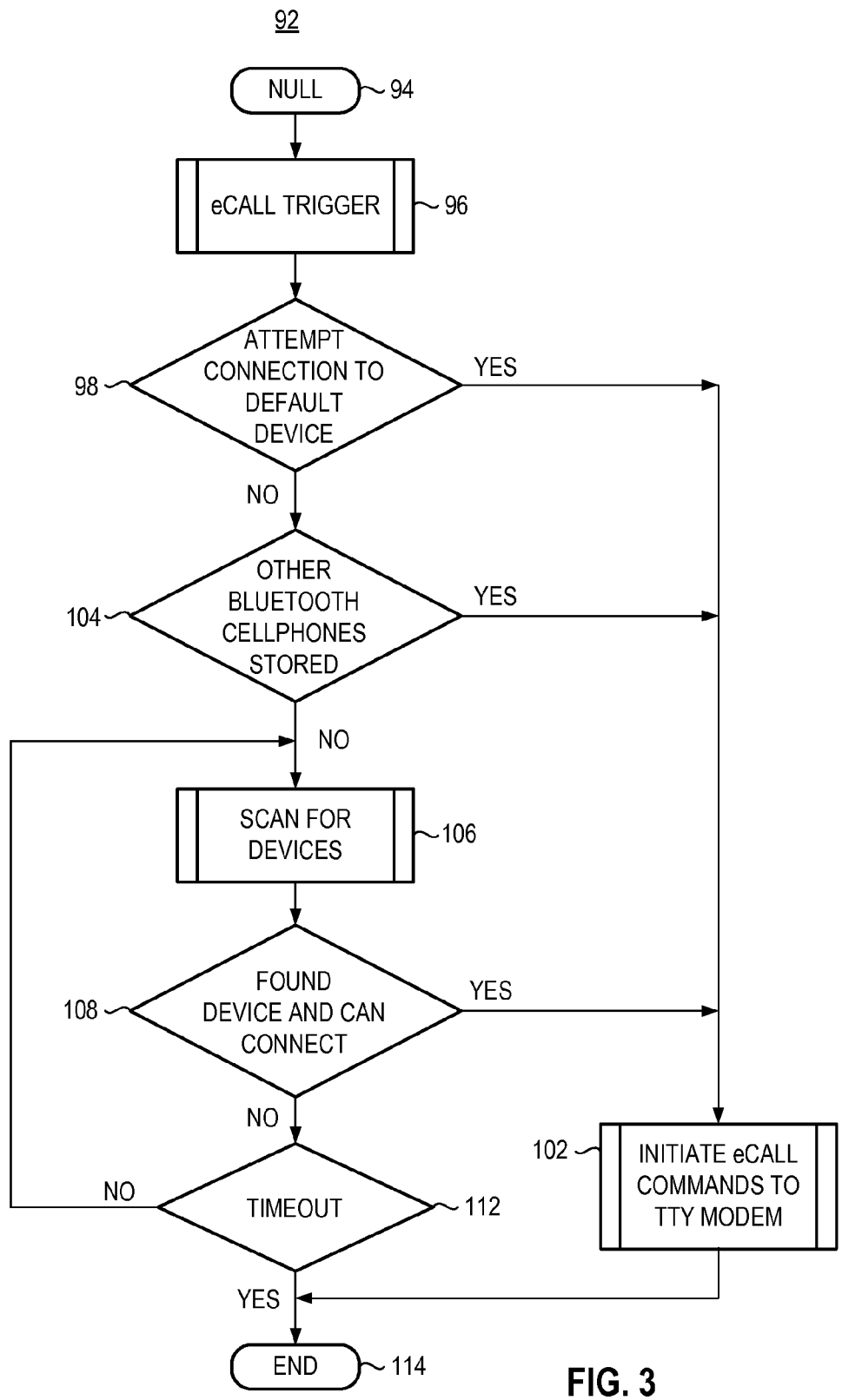
FIG. 3 illustrates a process diagram representative of operation of an embodiment of the present invention.

FIG. 3 illustrates a process diagram, shown generally at 92, representative of exemplary operation of an embodiment of the present invention. After entry at the null state 94, a path is taken to the block 96 at which an e-call is triggered responsive to the occurrence of a vehicular emergency.

A path is taken to the decision block 98 and at which an attempt is made to connect to a default device, i.e., a paired transceiver determined to be in proximity to the vehicular-positioned transceiver. If a connection is made, the yes branch is taken to the block 102, and an emergency call is initiated, including commands given to a TTY modem.

If, conversely, the attempt to connect to the default device is unsuccessful, the no branch is taken from the decision block 98 to the decision block 104. If the identity of another paired transceiver is available, the yes branch is again taken to the block 102 and the emergency call is initiated. If, conversely, no other identities are stored, the no branch is taken from the decision block 104 to the block 106 and a scan is made to search for available, paired transceivers.

Then, and as indicated by the decision block 108, a determination is made whether an alternate transceiver is located. If so, the yes branch is taken to the block 102. Otherwise, the no branch is taken to the block 112, and a determination is made as to whether a timeout period has timed out. If not, the no branch is taken back to the block 106 and the procedure continues. If, conversely, the timeout period has timed out, the yes branch is taken to the end block 114. A branch is also taken upon conclusion of the block 102 to the end block 114.

Figure 4:
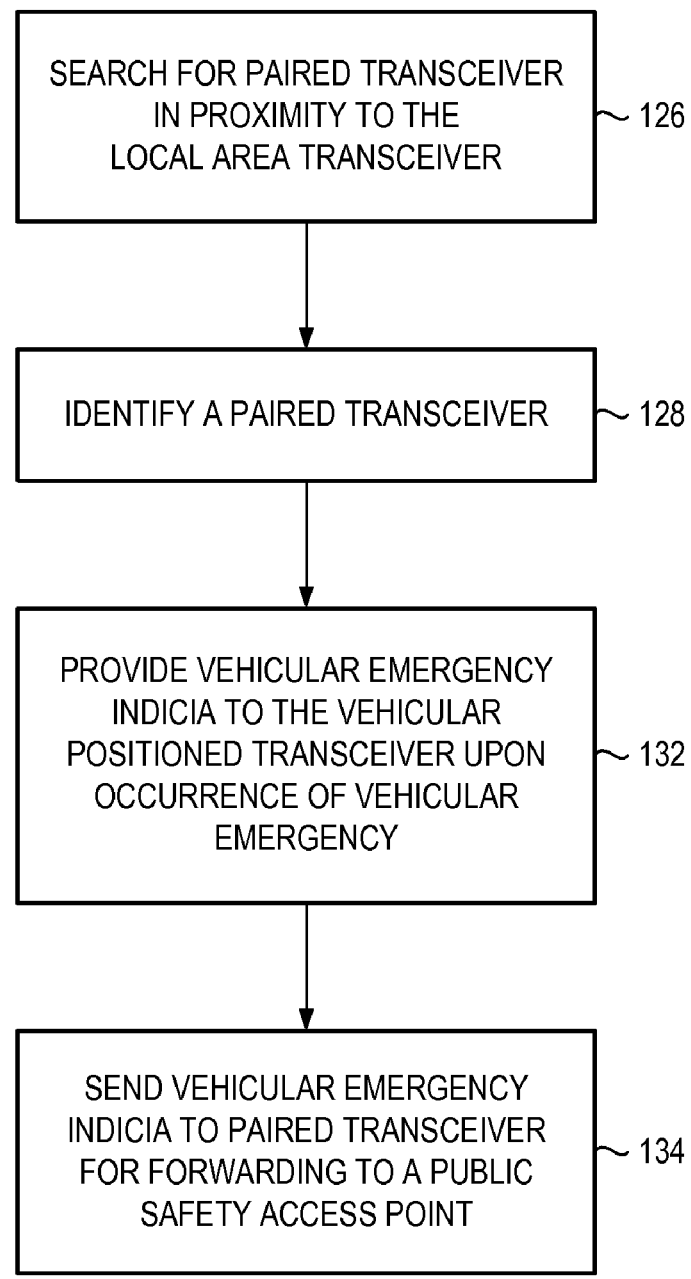
FIG. 4 illustrates a method flow diagram listing the method of operation of an embodiment of the present invention.

FIG. 4 illustrates a method flow diagram, shown generally at 124, representative of the method of operation of an embodiment of the present invention. The method facilitates communication of emergency data pursuant to a vehicular emergency.

First, and as indicated by the block 126, a paired transceiver search is performed by a vehicular-positioned local transceiver to identify a paired transceiver in proximity to the vehicular-positioned local transceiver. Then, and as indicated by the block 128, a paired transceiver is identified responsive to the paired transceiver search.

And, as indicated by the block 132, vehicular emergency indicia is provided to the vehicular-positioned transceiver upon occurrence of the vehicular emergency. Then, and as indicated by the block 134, the vehicular emergency indicia is sent to the paired transceiver for forwarding on to a public safety access point.

Thereby, upon occurrence of a vehicular emergency, a report of the vehicular emergency is automatically made, taking advantage of the availability of a mobile station positioned in proximity to the vehicle at which the vehicular emergency has occurred.

The previous descriptions are of preferred examples for implementing the invention, and the scope of the invention should not necessarily be limited by this description. The scope of the present invention is defined by the following claims.

What is claimed is:

1. Vehicular-positioned apparatus for initiating communication of emergency data pursuant to a vehicular emergency, said apparatus comprising:
  a paired transceiver detection initiation detector adapted to detect occurrence of a vehicular trip start event, said paired transceiver detection initiation detector configured to generate a pair-transceiver search command responsive to the occurrence of the vehicular trip start event;
  a local transceiver adapted to receive the paired transceiver search command generated by said paired transceiver detection initiation detector, to receive indicia associated with the vehicle at which said local transceiver is positioned, and to receive indication of occurrence of the vehicular emergency, said local transceiver configured to perform a pair transceiver search responsive to the paired transceiver search command and to generate a vehicular emergency report responsive to the indication of the occurrence of the vehicular emergency.

2. The vehicular-positioned apparatus of claim 1 wherein the vehicular trip start event of which the occurrence thereof said paired transceiver detection detector is adapted to detect comprises turning of a vehicular ignition switch.

3. The apparatus of claim 1 wherein the vehicular trip start event of which the occurrence thereof said paired transceiver detection detector is adapted to detect comprises user actuation of a vehicular mounted actuator.

4. The apparatus of claim 1 wherein the pair transceiver search performed by said local transceiver is performed successively at selected intervals responsive to reception of the paired transceiver search.

5. The apparatus of claim 1 further comprising a memory element configured to store search results obtained responsive to performance by said local transceiver of the pair transceiver search.

6. The apparatus of claim 5 wherein the search results stored at said memory element comprise identifiers that identify a paired transceiver, capable of a communication with said local transceiver.

7. The apparatus of claim 6 wherein, when performance of the paired transceiver search identifies a plurality of paired transceivers, said memory element is configured to store identifiers that identify each of the plurality of paired transceivers.

8. The apparatus of claim 6 wherein the identifiers that identify a paired transceiver comprise an IP (Internet Protocol)-formatted address.

9. The apparatus of claim 1 wherein said local transceiver comprises a Bluetooth™-capable transceiver.

10. The apparatus of claim 1 wherein the indicia associated with the vehicle that said local transceiver is adapted to receive comprises a vehicular identification number that uniquely identifies the vehicle.

11. The apparatus of claim 1 wherein the indication of the vehicular emergency that said local transceiver is adapted to receive comprises an indication that identifies which type of vehicular emergency that has occurred.

12. The apparatus of claim 1 wherein the vehicular emergency report generated by said local transceiver is for communication to a public safety access point by way of a paired transceiver identified responsive to performance of said paired transceiver search.

13. A method for facilitating communication of emergency data pursuant to a vehicular emergency, said method comprising the operations of:
performing a paired transceiver search by a vehicular-positioned local transceiver to identify a paired transceiver in proximity to the vehicular-positioned local transceiver;
identifying a paired transceiver responsive to the paired transceiver search;
providing vehicular emergency indicia to the vehicular-positioned transceiver upon occurrence of the vehicular emergency;
sending the vehicular emergency indicia to the paired transceiver for forwarding onto a public safety access point.

14. The method of claim 13 further comprising the operation of forwarding on the vehicular emergency indicia to the public safety access point.

15. The method of claim 14 wherein the paired transceiver comprises a TTY element and wherein the vehicular emergency indicia is forwarded as TTY-formatted data.

16. The method of claim 14 wherein the vehicular-positioned transceiver comprises a Bluetooth™-compatible transceiver and wherein said operation of performing the paired transceiver search comprises performing a search for a Bluetooth™-compatible transceiver.

17. The method of claim 16 wherein the paired transceiver identified during said operation of identifying comprises a cellular radio transceiver having a Bluetooth™-capable part.

18. The method of claim 17 wherein the cellular radio transceiver comprises a TTY capability and wherein said operation of sending comprises placing the vehicular emergency in TTY-format form.

19. The method of claim 18 wherein said operation of sending comprises contacting the public safety access point and exchanging TTY-formatted data with the public safety access point.

20. A method for alerting a public safety access point of a vehicular emergency, said method comprising the operations of:
providing a vehicle with a local area transceiver;
identifying a wide area transceiver having local area transceiver capability in proximity with the local area transceiver of the vehicle;
identifying a wide area transceiver having local area transceiver capability in proximity with the local area transceiver of the vehicle;
alerting the wide area transceiver of occurrence of the vehicular emergency by sending signals generated at the local area transceiver to the wide area transceiver;
communicating an indication of the occurrence of the vehicular emergency to the public safety access point using the wide area transceiver.

* * * * *